Inventors
Yoshio Matsumoto
Yasuyoshi Nemoto
Kosaku Suzuki

United States Patent Office

3,250,605
Patented May 10, 1966

3,250,605
METHOD OF MANUFACTURING A SUBSTANTIALLY STRESS FREE CATHODE RAY TUBE
Yoshio Matsumoto, Tokyo, Yasuyoshi Nemoto, Kanagawa-ken, and Kosaku Suzuki, Tokyo, Japan, assignors to Sony Corporation, Shinagawa-ku, Tokyo, Japan, a corporation of Japan
Filed Sept. 17, 1963, Ser. No. 309,453
4 Claims. (Cl. 65—41)

The present invention relates to the manufacture of cathode ray tubes or similar articles, and more specifically, to a method of manufacturing a cathode ray tube which is substantially free from stress in the glass.

The problems of relieving glass stress are particularly acute in newly developed cathode ray tubes which have quite short neck lengths and relatively small diameters. Attempts to mount a stem onto the necks of such tubes to support an electron gun necessitated a rapid heating of an extremely limited area so as not to affect the cathode materials adversely. As a result, the glass in the sealed portion was left in a permanently stressed condition, and this made the tube liable to cracks, gas leakage, and damage to the cathode members.

The usual technique for relieving stress from glass products involves reheating them and gradually cooling through the transition temperature of the glass. With this technique, it is particularly important to cool the glass as slowly as possible from the softening temperature of the glass to the transition point. Otherwise, severe distortions are likely to occur in the glass. However, the tube elements such as cathode, particularly, are likely to be deteriorated by the gradual cooling in air. Accordingly, it has been deemed necessary to carry out the gradual cooling treatment by replacing air in the glass bulb with an inert gas such as nitrogen. Even then, if there is a difference in temperature of about 10° C. between the inner and outer surfaces of the glass bulb, it has been found that the inner surface must be cooled for a time of at least 10 times as long as that required for the outer surface in order to remove the stress completely.

Accordingly, an object of the present invention is to provide an improved method for the manufacture of cathode ray tubes which avoids introducing distortions into the sealed portions of the tube.

Another object of the invention is to provide an improved annealing treatment for joining a stem to the neck of a cathode ray tube without damage to the electron emissive elements contained within the tube.

Still another object of the invention is to provide a method for relieving stress in the necks of small sized cathode ray tubes.

A further object of the invention is to provide a method for manufacturing cathode ray tubes in which the time for annealing is reduced substantially.

Figure 1:
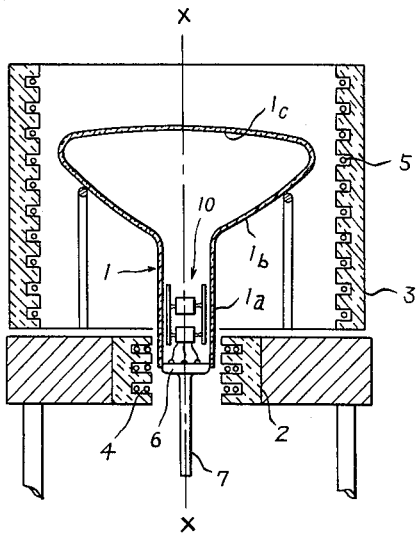
Figure 2:
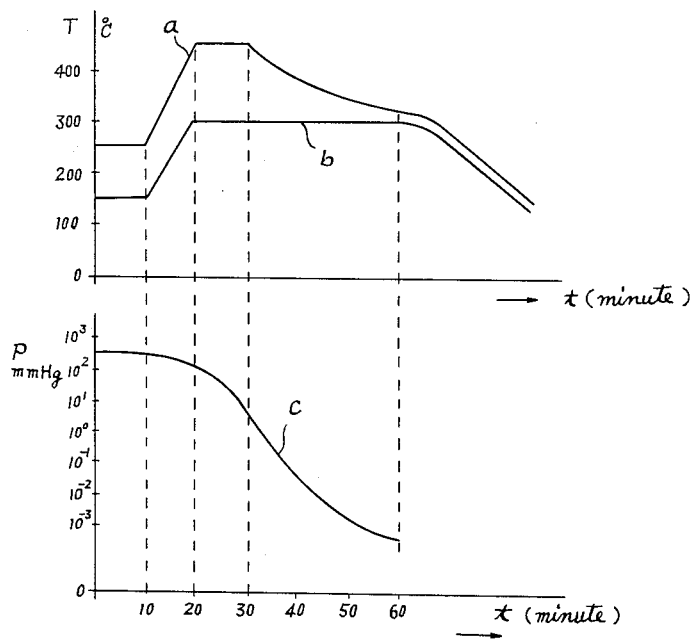

Other objects and features of the present invention will become apparent from the following description taken in conjunction with the accompanying drawings in which:

FIGURE 1 is a somewhat schematic view of a dual furnace system which can be advantageously employed to the practice of the present invention; and FIGURE 2 is a series of graph plotting temperatures and degree of evacuation of the tube as a function of time.

As shown in the drawings:

In FIGURE 1, reference numeral 1 indicates generally a cathode ray tube including a relatively small diameter neck portion 1a, a conical portion 1b, and a screen portion 1c. As shown in FIGURE 1, the cathode ray tube 1 is adjustably positionable by conventional means, not shown, between a pair of furnaces 2 and 3, furnace 2 being an annealing furnace for heating the tube in the vicinity of the neck, and furnace 3 being a heating furnace for maintaining the proper temperature in the other portions of the tube. The furnaces 2 and 3 are independently energized and controlled by means of electric heating elements 4 and 5 respectively.

A bulb stem 6 carrying an electron gun assembly generally indicated at reference numeral 10 is inserted into the neck portion 1a of the tube 1 and sealed in the conventional manner either in air or in an inert gas atmosphere such at nitrogen. Immediately after the seal of the stem has been completed, tthe tube 1 is moved downwardly (or the furnaces are moved relatively to each other) so that about ⅔ of the neck portion 1a is inserted within the confines of the annealing furnace 2. At the same time, an evacuating tube 7 communicating with the interior of the cathode ray tube 1 is connected to a source of reduced pressure such as a vacuum line from a pump assembly (not shown). During annealing of the neck, it is desirable that the remainder of the tube 1 be heated to a uniform temperature in the furnace 3. It is therefore important to support the bulb properly within the furnaces along the tube axis which has been designated as X—X in the drawings.

While gas is being exhausted from the cathode ray tube, the temperature of the annealing furnace 2 is raised substantially up to the softening temperature of the particularly glass and is kept there for a short period of time, after which it is lowered gradually to secure proper annealing.

A proper set of temperature conditions and time intervals for operating the method of the present invention is illustrated in FIGURE 2 of the drawings. The upper part of the plot depicts the relationship between the temperatures of annealing, and the lower part depicts the vacuum conditions existing within the tube, both plotted against time. The curve $a$ represents the temperature existing in the annealing furnace 2 at the various times, and curve $b$ shows the temperatures existing in the heating furnace 3 at the same times. Curve $c$ is a plot of the corresponding pressure conditions existing within the tube.

As illustrated in FIGURE 2, the temperature in the annealing furnace 2 is maintained at a value of about 250° C. initially for about 10 minutes after the cathode ray tube has been put into the furnace. The degree of vacuum at this time is negligible, and the pump used to exhaust the tube is started and operated continuously only after the stem 1a of the tube has been placed in the annealing furnace 2. In the next 10 minutes, the temperature of the annealing furnace is raised to about 450° C., while, at the same time, the temperature of the remainder of the bulb confined within the furnace 3 is raised to a temperature of about 300° C. or so. The annealing temperature, which in the illustrated example is assumed to be at about 450° C., corresponding to the softening point of the glass, is maintained for about 10 minutes in the annealing furnace 2. Thereafter, the stem portion 1a is gradually cooled for about 30 minutes at a rate of about 3 to 5° C. a minute, while the remainder of the bulb is maintained at the relatively constant temperature of 300° C. or so. Finally, when the temperature in the annealing furnace is decreased to about 300° C. after the expiration of the 30 minute cooling, the temperatures in both furnaces 2 and 3a are adjusted so that the entire bulb assembly cools at substantially the same rate. During this cooling period, the degree of vacuum within the tube is constantly increasing, as illustrated in curve $c$ so at the end of the 60 minute cycle, the absolute pressure within the tube is on the order of 1 micron of mercury. As illustrated in FIGURE 2, this degree of vacuum is achieved just before the neck portion and the remainder of the tube assume substantially equal cooling rates.

After the completion of the annealing operation, the tube is exhausted to the degree of vacuum desired in the final cathode ray tube. As a result of the foregoing treatment, oxidation of the electrode structures does not occur and no significant strain is introduced into the glass. As a result of the pre-exhaust, the bulb may be maintained in an exhausted condition, such as a vacuum on the order of 1 micron of mercury without affecting the final exhaust immediately upon completion of the sealing process, so the cathode and other electrode structures are not advertsely affected by temperature, humidity and similar conditions.

An analysis of cathode ray tubes produced according to the present technique through the use of a strain pair apparatus using polarized light shows that substantially all the distortions normally produced during annealing are removed from cathode ray tubes by the techniques of the present invention.

By the use of the method of the present invention, substantially the same temperature is obtained on both the inside and outside walls of the tube as well as at the sealed portion. The evacuation of the tube prevents deterioration of the electrode elements, without adversely affecting the electron emissivity characteristics of the cathode.

One of the significant improvements of the present invention arises from the fact that the heating source is placed on the outside of the bulb, and while the temperature of the glass becomes higher on the outside initially, the interior of the bulb is in a vacuum condition so that dissipation of heat is considerably lower than it would be in the presence of air or other gases. Accordingly, there is no heat loss due to conduction or convection, and the transfer of heat is caused almost solely by radiation. The radiation properties are substantially the same on both sides of the glass. Accordingly, substantially identical temperatures may be maintained inside and outside the bulb so that when the temperature reaches a stress relieving temperature, the stress may be uniformly removed without causing deformation of the bulb. Accordingly, the stress on the glass sealed portion may be easily and completely removed in a short time.

Another important reason which explains why distortions may be removed completely in a short time under the conditions of the present invention arises from the fact that an external force nearly equal to 1 atmosphere of pressure is applied to the glass in the exhausted condition. When the glass is maintained at the stress relieving temperature under such conditions, distortions which may have been present are cancelled or alleviated in an extremely short time, thereby reducing the tendency of the glass to break or crack due to tensile forces.

From the foregoing, it will be evident that the method of the present invention provides a quick highly effective means for producing a substantially stress free neck portion of a cathode ray tube without damage to the electrical elements and without distortion of the tube. It should also be evident that many modifications and variations can be effected to the described embodiments without departing from the scope of the present invention.

We claim as our invention:

1. The method of manufacturing a glass cathode ray tube having a relatively small diameter neck portion and a larger diameter conical portion which comprises securing a stem to the neck of said tube, heating the neck of said tube to a temperature about the softening point of the glass, simultaneously heating the conical portion to a temperature below said softening point, continuously evacuating said tube during such heating, holding the temperature of said conical portion substantially constant while cooling the neck portion below said softening temperature until the temperatures of said conical portion and said neck portion are substantially equal and thereafter cooling the entire tube slowly to thereby produce a substantially stress free neck portion.

2. The method of manufacturing a glass cathode ray tube having a relatively small diameter neck portion and a larger diameter conical portion which comprises securing a stem within the neck of said tube, heating the neck of said tube to a temperature about the softening point of the glass, simultaneously heating the conical portion to a temperature below said softening point, continuously evacuating said tube during such heating, cooling the neck portion of said tube at a slow rate while holding the temperature of said conical portion substantially constant, and when the temperature of said neck portion and said conical portion are substantially equal, cooling said neck portion and said conical portion at substantially equal rates.

3. The method of claim 2 in which said neck portion is heated to a softening temperature of about 450° C., and the conical portion is heated to a maximum temperature of about 300° C.

4. The method of claim 2 in which said tube is evacuated to an absolute pressure of about 1 micron of mercury before the temperatures of said neck portion and said conical portion become substantially equal.

References Cited by the Examiner

UNITED STATES PATENTS 1,461,155   8/1923   Madden et al. _____ 65—36 X

DONALL H. SYLVESTER, *Primary Examiner.*

GEOFFREY R. MYERS, *Assistant Examiner.*